Dec. 6, 1966  T. GARCIA ETAL  3,289,557
EXTREME ENVIRONMENTS PROTECTIVE CAMERA ENCLOSURE
Filed Nov. 9, 1964

INVENTORS.
THOMAS GARCIA
CARL G. DAUS
ALFRED CELESTINE
PAUL D. BEVIS
BY
P. H. Firsht
ATTORNEY.

United States Patent Office 3,289,557
Patented Dec. 6, 1966

3,289,557
EXTREME ENVIRONMENTS PROTECTIVE
CAMERA ENCLOSURE
Thomas Garcia, Carl G. Daus, and Alfred Celestine, China Lake, and Paul D. Bevis, Ridgecrest, Calif., assignors to the United States of America as represented by the Secretary of the Navy
Filed Nov. 9, 1964, Ser. No. 410,038
6 Claims. (Cl. 95—11)

The invention described herein may be manufactured and used by or for the Government of the United States of America for governmental purposes without the payment of any royalties thereon or therefor.

The present invention relates generally to protective enclosures and more particularly to a protective camera enclosure adapted to retain a camera within a heated, positively and/or negatively pressurized, debris-filled or "dirty" atmosphere.

Those concerned with the development of rocket motors and nozzles have long been aware of an existing need for a system which affords effective photographic observation of a rocket motor's exhaust during the various phases of motor test firing. Normally, the motor is mounted on a stand located in a vacuumized environmental or firing chamber and test-fired in a static condition. In instances where conditions of altitude must be simulated, the motor is initially exhausted into the vacuumized test chamber. Attempts to photograph a motor and/or its exhaust stream, during initial periods of test firing have been limited to techniques wherein a camera is directed through a camera port arranged within the shell of the chamber. This technique evolved due to the fact that available camera systems normally cannot withstand the effects of the intense heat, vibrations, vacuums, pressures, and corrosive gases ordinarily found within a test chamber. However, this technique is far from satisfactory, particularly where photographic coverage of a test firing must begin before exhaust extravasation and extend for a relatively long period of time, as dense smoke and debris are initially trapped within the chamber and tend to obscure the subject from the camera's view. Consequently, much available and valuable information may be lost during a given test firing operation.

Therefore, the general purpose of the present invention is to provide a reusable camera enclosure which may be mounted within a test chamber for overcoming the aforementioned disadvantages.

Briefly, the camera enclosure comprises a sealed container, of sufficient strength for withstanding contemplated positive and negative pressures, mounted within a rocket motor test chamber. A protective coating of silicon rubber surrounds and encases the container. The container is filled with cast silicon rubber within which is nestled a motion picture or television camera. A camera port extends from the camera's lens to the exterior surface of the enclosure. A quartz disk is mounted within the container, or within a sealed case mounted on the enclosure ahead of the lens to seal the camera port against ambient atmosphere. Means are provided for imparting rapid rotation to the disk, whereby the radial segments of the disk are successively introduced into the port as "clean" segments and, subsequently, passed from the port as "dirty" segments. Thus as film build-up occurs on the surface of a given radial segment, it may be rapidly transported from a camera view obstructing disposition and replaced by a "clean" segment passing into and through the port. Consequently, the camera's view remains substantially unobstructed throughout the test firing.

It is an object of the instant invention to provide an extreme environment protective camera enclosure.

Another object is to provide a camera enclosure which accommodates the use of a camera in a rocket motor test chamber.

A further object is to provide a device which affords close-up photographic examination of rocket motor test firings.

Still another object is to provide in a protective enclosure for a photosensitive device for substantially reducing atmospheric effects on a port window through which beams of light may be directed to impinge on the device.

Yet another object is to provide means for constantly maintaining a "clean" window for a photographic port disposed in a "dirty" atmosphere.

Other objects, advantages and novel features of the invention will become apparent from the following detailed description of the invention when considered in conjunction with the accompanying drawings wherein:

FIG. 1 comprises a view of the camera enclosure of the instant invention, its operative disposition within a rocket motor test chamber;

Figure 1:
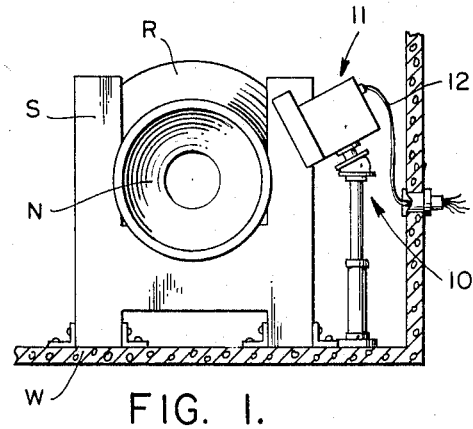
Figure 2:
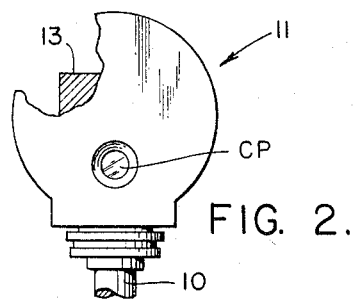
FIG. 2 is a partial end view of the enclosure of FIG. 1.

Turning now to the drawings, wherein like reference characters designate like or corresponding ports throughout the several views, there is shown in FIG. 1 a horizontally disposed rocket motor R mounted on a test stand S fixed to the bottom wall W of a rocket motor test chamber. Attached to the rocket motor R is a nozzle N through which hot gases of combustion are exhausted from the motor R, and into the test chamber, as the motor R is fired. Mounted on an adjustable, telescoping enclosure mounting 10 is the protective enclosure 11 of the instant invention. The enclosure 11 may be mounted by any suitable means and at any desired angle or position relative to the rocket motor R and/or the nozzle N, in order to selectively position its camera port CP, FIG. 2. As illustrated in FIG. 1, the enclosure 11 is mounted on the mounting 10 adjacent the nozzle N with the camera port CP disposed at a suitable angle for accommodating a photographic examination of the stream of exhaust gases as it is expelled through the nozzle N. While various means may be employed to couple the operative mechanisms of the enclosure 11 with externally mounted devices and power supplies, a heavily insulated electrical conduit 12 passing through the chamber wall has been found to function quite satisfactorily.

Figure 3:
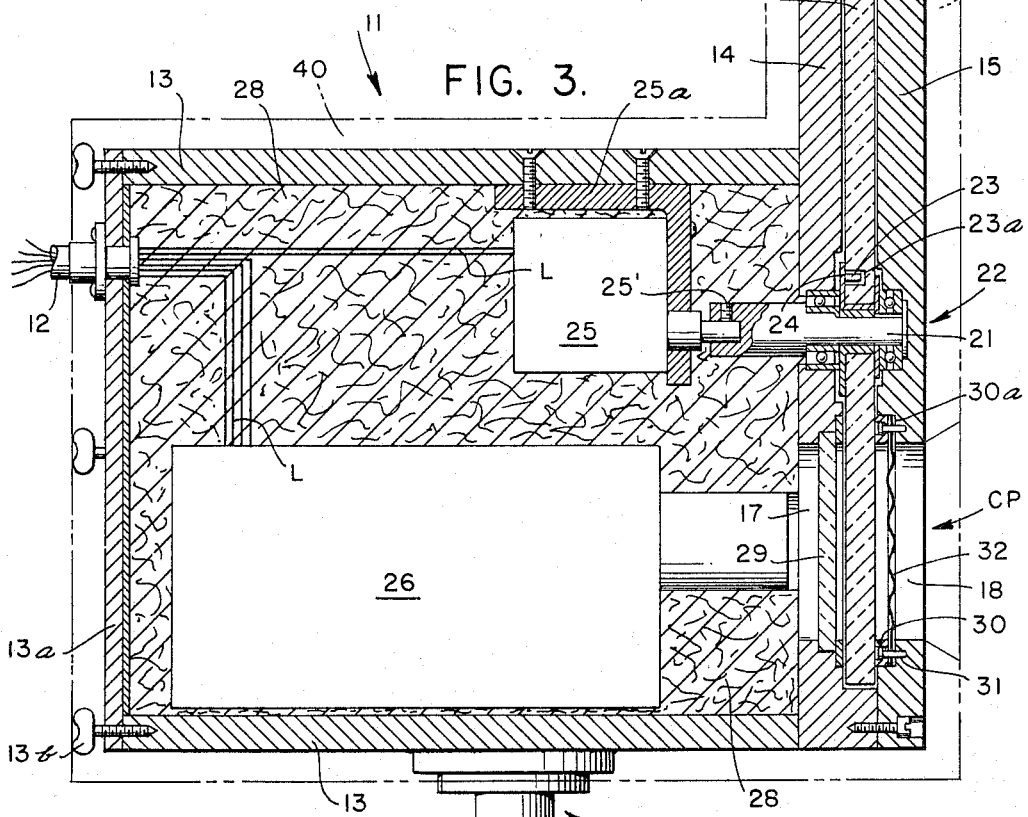
FIG. 3 is a vertical cross section of the enclosure of FIG. 1 illustrating an operative arrangement for a mounted camera and the port sealing disk, as provided for within the enclosure of FIGS. 1 and 2.

Turning now to FIG. 3, the enclosure 11 comprises a sealed hollow shell or housing including steel walls 12 and a reinforced access cover plate 13a secured in place across one end of the housing by screws 13b, and a port pan or plate 14 mounted across the opposite end of the housing.

The port pan or plate 14 is of a circular, dish-shaped configuration and is mounted to face outwardly from the enclosure housing. A cover plate 15 is mounted across the open face of the pan 14 and is secured in place by any suitable means, such as screws 15a, for example, which afford a selective removal of the plate 15. The plates 14 and 15 are provided with co-axially aligned, circular openings 17 and 18, respectively, which form the port CP.

A rotatable disk 20, formed of polished fused quartz, is housed between the plates 14 and 15 and extends transversely between the openings 17 and 18 for establishing an atmospheric seal therebetween. The disk 20 is supported by means of a drive-shaft 21 arranged to extend through the disk's axis of rotation and is mounted for rotation in a conventional bearing support, generally designated 22. A coupling pin 23 extends into a coupling detent or opening 23a formed in the disk 20 and serves to couple the disk 20 with the drive-shaft 21 through a coupling-collar 24 fixed to both the shaft 21 and the pin 23. Consequently, the disk 20 may be caused to rotate in a transverse plane, across the port CP, by imparting radial rotation to the shaft 21. A 115-volt A.C. disk-drive motor 25, which is fixedly secured to a bracket 25a mounted within the housing 13, is coupled to the shaft 21, by means of a set-screw 25'. The motor 25 serves to rotate the shaft 21 for displacing radial segments of the disk 20 transversely through the port CP and, therefore, through the view of an enclosure-mounted camera 26.

Various means may be employed for mounting the disk 20 and for imparting rotation thereto. For example, the disk 20 may be supported in a ring gear and driven through conventional pinion gearing. However, it is necessary that the means employed be capable of rotating the disk 20 through 360° of revolution at a rate dictated by the duration of operation of an enclosure mounted camera. As presently provided for, the operation of the enclosure mounted camera 26 extends through a 60-second interval, therefore, the disk 20 must be rotated by the shaft 21 at one revolution per minute. Further, in order to compensate for any contemplated increased rate in debris build-up on the surface of the disk segments, deposited thereon as debris-laden atmosphere is admitted through the opening 18, a disk of a larger diameter may be employed so that the rate of segment displacement may be increased.

Figure 4:
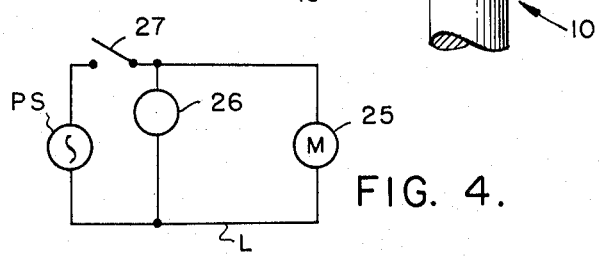
FIG. 4 comprises a schematic view of an electrical circuit that may be utilized to maintain the existence of an operative relationship between the camera and the disk of FIG. 3.

The enclosure mounted camera 26 is of any suitable design, and may comprise either a television pickup tube or a conventional motion-picture camera. As presently provided for, the camera comprises a motion-picture camera, having a 10 millimeter lens, which operates at 400 frames per second. In order to obtain maximum efficiency, it is necessary to co-ordinate the operation of the motor of the camera 26 with the drive motor 25. This may be provided for by connecting the motors in circuit parallel, FIG. 4, through leads L, and a circuit series switch 27 arranged between the parallel circuit and an electrical power supply 28. If desired, the switch 27 may comprise a condition responsive device which responds to given conditions existing within the test chamber. As a practical matter, a manual "on-off" switch has been found sufficient for satisfying existing needs.

The motor 25, camera 26 and leads L are encased in a packing 28 of silicon rubber compound, commonly known as RTV 60 silicon rubber compound. The camera 26 is suspended in a pocket, formed in the packing 28 as the rubber compound is poured into the shell or housing and allowed to harden in a known manner. As the rubber cast, the housing of the camera 26 is so supported that the lens of the camera will be disposed adjacent the port CP and directed outwardly therethrough.

In some instances, where exceptionally high temperatures are to be encountered, it may be found desirable to seal the opening 17 by means of heat resistant glass lens 29 in order to protect the camera lens from the heat of ambient atmosphere. However, in most instances the lens 29 may be eliminated.

Since it is imperative that ambient atmosphere present in the port CP be precluded from escaping laterally and contacting those segments of the disk 20 not disposed in a port sealing position within port CP, a ring seal 30, formed of Teflon or other suitable material, is seated on a circular shoulder 30a formed about the opening 18 adjacent the disk 20. Suitable means, such as pins 31 and a corrugated spring 32, may be provided to retain the ring seal 30 in frictional sealing engagement with the surface of the disk 20 for maintaining the port CP in a sealed condition. Hence, it is to be understood that the radial segments of the disk 20 are subject to the effects of ambient atmosphere only so long as they are positioned across the port CP and that these segments serve to positively exclude ambient, debris-ladened atmosphere from the enclosure 11. It is to be further understood that the fused quartz disk 20 is of a thickness sufficient for withstanding the conditions normally developed within the test chamber. Thus the radial segments of the disk 20, as they are displaced through the port CP, function to provide displaceable and sealed windows, or lenses, through which the camera 26 may be directed for photographing subjects disposed within the test chamber.

A protective coating 40 of RTV 60 silicon rubber compound of suitable thickness is provided to surround the shell 13 and serves to protect the shell from the effects of the gases present within the chamber. As a practical matter, the silicon rubber compound may be cut with a sharp instrument to afford access to the various enclosure components. Since the rubber compound may be readily welded by brushing abutting surfaces with the silicon rubber in liquid form, the enclosure may be disassembled for cleaning and inspection, and film removal, and then reassembled in a relatively short period of time. Consequently, after each firing, the exposed film may be retrieved and the disk 20 cleaned, whereupon the camera is reloaded and the cleaned disk 20 again inserted to accommodate a recording of a subsequent test firing.

In operation, the assembled camera enclosure 11 is mounted and adjusted within the test chamber. The motor of camera 26 and disk-drive motor 25 are connected with the power source 28. At a predetermined point in the test firing operation, the switch 27 is closed. The motor 25 and the motor of camera 26 are thus activated simultaneously, whereupon the photographic operation and disk rotation is initiated, whereby the disk 20 is caused to rotate for continuously displacing the disk segments transversely through the port CP, so that smudged or debris-ladened segments are continuously replaced by clean, transparent segments throughout the photographic operation. Thus, a substantially unobstructed view is continuously provided for the camera 26 throughout the desired interval of test firing time.

While the disk 20 has been described as being disposed across a camera port CP arranged within an enclosure 11, it is also considered feasible to mount the disk 20 across a camera port formed within the wall of an environmental chamber, whereby the camera may be disposed outside a given chamber and directed thereinto.

In view of the foregoing, it is to be understood that the device of the instant invention provides a simple economic device which permits a photosensitive device, particularly a camera, to be effectively operated within a positively and/or negatively pressurized, heated, and debris-ladened atmosphere.

Obviously many modifications and variations of the present invention are possible in the light of the above teachings. It is therefore to be understood that within the scope of the appended claims the invention may be practiced otherwise than as specifically described.

What is claimed is:

1. An enclosure of the type adapted to insure effective operation of a light sensitive device within a heated, dirty atmosphere comprising, in combination:

a sealed housing having an opening extending into said housing for conducting beams of light projected from an external source;

means mounting a light sensitive device within said housing and adjacent said opening adapted to retain said device for intercepting projected light beams conducted through said opening;

a rotatable disk of transparent material having a first and a second plane side surface mounted on said housing across said opening with radial segments of its first side surface disposed across said opening facing said device and radial segments of its second side surface facing said source, and having an axis of rotation aligned in an off-set, parallel relationship with respect to the longitudinal axis of said opening;

an operative power train connected with said disk and adapted to rotate said disk about its axis of rotation, whereby successive radial segments of said disk are caused to progress across said opening as said power train is actuated;

means defining a disk cover arranged adjacent to the second side surface of said disk and mounted on and sealed to said housing and having means defining therein a port disposed in coaxial alignment with said opening; and sealing means disposed about the circumference of said port and extending between said disk cover and said second surface of said disk adapted to seal said port to ambient atmosphere, whereby the radial segments of said disk may be exposed to ambient atmosphere only at such time as they may become interposed between said opening and said port.

2. The enclosure as defined in claim 1, means further including:

a sealed protective covering surrounding said enclosure and having means defining a light beam conducting conduit arranged in co-axial alignment with said port and said opening for conducting said beams of light therethrough.

3. The combination as defined in claim 2 further characterized in that said means for mounting said light sensitive device comprises cast, shock-absorbent silicon rubber filling said housing and providing a retention pocket for receiving the device.

4. A photographic device adapted to be disposed within a rocket motor test chamber adjacent the exhaust nozzle of a firing rocket motor, comprising, in combination:

a sealed housing having an opening extending through a given wall thereof;

an operable camera including an electrical actuating means therefor mounted within said housing with the lens thereof being directed through said opening;

a silicon rubber casting surrounding and supporting said camera;

a rotatable disk of transparent material mounted on said housing having radial segments thereof so disposed as to be displaced across said opening as said disk is rotated;

an electrically operable means connected with said disk adapted to be activated for rotating said disk about an axis of rotation extending parallel to the longitudinal axis of said opening;

an electrical power source;

an electrical circuit means interconnecting said drive means with said electrical actuating means and said power source adapted to activate said actuating means and said drive means in unison, whereby said disk may be caused to rotate only as said camera is actuated;

a sealed disk cover mounted on said housing with said disk disposed therebetween and including means defining a port extending through the cover in co-axial alignment with said opening of said housing;

sealing means disposed about said port adapted to establish an ambient atmosphere seal between said cover and said disk; and a silicon rubber protective casing surrounding said housing and said cover having an opening therethrough arranged in co-axial alignment with said port, whereby said camera may be activated and said disk rotated in unison therewith for continuously maintaining a transparent disk segment between the lens of said camera and ambient atmosphere.

5. In a protective mount for a light sensitive device of a type adapted to protect the device from external atmosphere and external pressures, means comprising:

a sealed container including walls of predetermined strength and mounting and support means arranged within said container for receiving said light sensitive device;

means defining an open-ended, tubular light passageway extending from the exterior of said container to said device;

a solid transparent disk disposed in said container and generally bisecting said passageway;

means supporting said disk for rotation about a fixed axis of rotation displaced from said passageway and arranged in a generally parallel relationship with respect thereto;

disk sealing means disposed in contact with ambient atmosphere and arranged about the circumference of said passageway in sealing engagement with said disk for establishing an ambient atmospheric seal therebetween, whereby passage of ambient atmosphere into said container is precluded; and means adapted to impart rotation to said disk, whereby successive radial segments of said disk may be displaced across said passageway in succession as said disk is rotated.

6. In a sealed camera enclosure adapted to support a camera for operation in an environment of "dirty" ambient atmosphere:

means defining an open-ended tubular lens port extending through the enclosure to ambient atmosphere through which a camera's lens may be directed;

port sealing means establishing an atmospheric seal between the ends of said port, comprising successive radial segments of a transparent optical flat;

means for rotating the successive radial segments of said flat transversely through said port while maintaining a constant atmospheric seal between the ends thereof; and means limiting ambient atmosphere exposure of said segments to ambient atmosphere present within said port, whereby each successive segment is rotated into said port in a transparent condition.

References Cited by the Examiner

UNITED STATES PATENTS

| | | | |
|---|---|---|---|
| 1,463,704 | 7/1923 | Kent | 296—84 |
| 3,192,533 | 6/1965 | Zabel | 346—107 |

References Cited by the Applicant

UNITED STATES PATENTS

| | | |
|---|---|---|
| 2,697,242 | 12/1954 | Elowson et al. |
| 2,745,131 | 5/1956 | Auwarter. |
| 2,878,716 | 3/1959 | Leonard. |

JOHN M. HORAN, *Primary Examiner.*